No. 765,393. PATENTED JULY 19, 1904.
W. A. MOELLER.
THILL SUPPORT.
APPLICATION FILED MAR. 14, 1904.
NO MODEL.
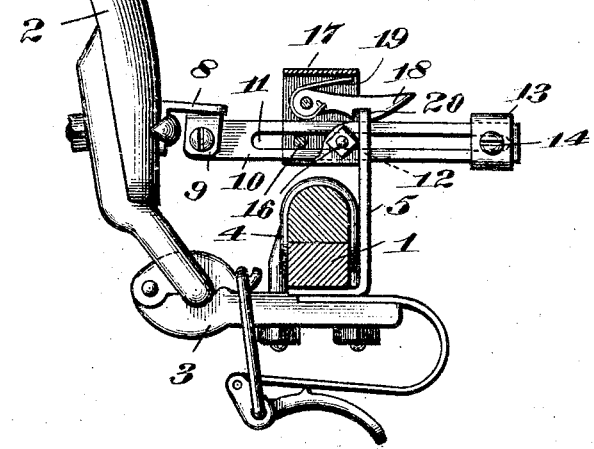
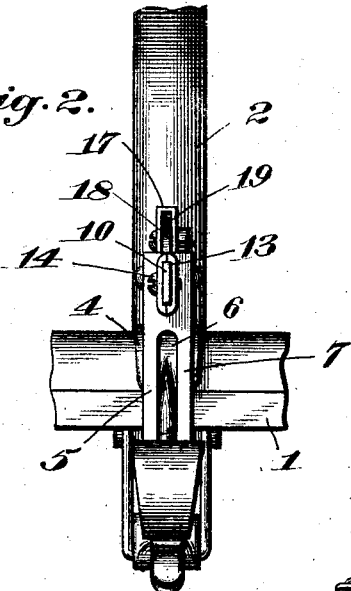
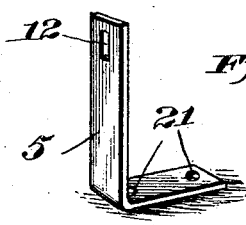
WITNESSES:
Elmer Seavey
Geo. S. Hamlin
INVENTOR
Wm. A. Moeller
BY
Henry W. Copp
his Attorney No. 765,393. Patented July 19, 1904.

UNITED STATES PATENT OFFICE.

WILLIAM A. MOELLER, OF CINCINNATI, OHIO.

THILL-SUPPORT.

SPECIFICATION forming part of Letters Patent No. 765,393, dated July 19, 1904.

Application filed March 14, 1904. Serial No. 198,019. (No model.)

*To all whom it may concern:*

Be it known that I, WILLIAM A. MOELLER, a citizen of the United States, residing at Cincinnati, county of Hamilton, and State of Ohio, have invented certain new and useful Improvements in Thill-Supports, of which the following is a specification.

This invention relates to devices for supporting thills or shafts of the ordinary vehicle and may also be applied to the tongue of the ordinary vehicle.

The object of the invention is the provision of means whereby the thill is held in certain predetermined positions, and thereby prevented from coming in contact with the dashboard when thrown up or coming in contact with the ground when lowered.

A further object of the invention is the provision of means for adjusting the means for holding the thill in its raised or lowered position.

A still further object of the invention is the novel way in which the operation is performed and in the combination of parts and special features, which will be more fully hereinafter described, and pointed out in the appended claims.

I attain these objects by means which will be illustrated in the accompanying drawings, in which—

Figure 1 is a side view, partly in section, of the device and showing the axle in section. Fig. 2 is a rear view showing the bifurcated clip which is secured to the axle. Fig. 3 shows a modification of this clip, and Fig. 4 shows my preferred form of pivoting the guide-bar to the thill.

Referring more specially to the drawings, 1 represents the axle of usual form, and 2 represents the thill, which is secured through a coupling 3 of ordinary construction to the axle 1 by a U-shaped clip 4. Beneath the axle and secured thereto by the U-shaped clip is an L-shaped clip 5, provided with an elongated aperture 6, defining arms 7, which are adapted to straddle the clip 4 and be engaged thereby.

Removably secured to the thill at a suitable point is an L-shaped angle-iron 8, having ears or lugs 9, between which is pivoted the guide-bar 10, with a slot 11 extending almost the entire length of said bar. This bar is adapted to be inserted through a slot 12 in the clip 5 and reciprocate therethrough.

Adjustably secured to the bar 10 on one side of the clip 5 is an adjusting device 13, which is held in position upon the bar 10 by the set-screw 14, which passes through the slot 11. On the opposite side of the clip 5 and adjustably secured to the bar 10 by means of set-screws 16 is an inverted-U-shaped member 17, in which is pivoted a pawl 18, actuated by the spring 19 and which is notched at 20, so as to engage the upper end of the clip 5. This U-shaped member may be adjusted to and fro upon the bar 10 to any desired degree, as also may be the adjusting device 13.

When it is desired to lower the thill, the catch 18 is raised from its engagement with the clip 5 and the thill is allowed to descend until the adjusting device 13 comes in contact with the clip 5, which limits its downward movement.

It will be understood that when the thill is raised the bar 10 will slide through the slot 12 in the clip 5 until the catch 18 comes in engagement with the clip 5, when it will ride up upon said clip until the notch 20 comes in register with said clip 5 and then will drop to prevent any farther movement of the thill upward. This prevents the thill from coming in contact with the dashboard and damaging it, which is not the case with most thill-supports.

In Fig. 3 I have shown a modification of the clip 5 whereby the U-shaped clip is adapted to pass through holes 21 in the lower portion thereof.

In Fig. 4 I have shown the preferred form of the means for attaching the bar 10 to the thill. In this two members 22 of like design are secured together by bolts 23 and 24, on the latter of which the bar 10 is adapted to pivot.

Having thus described my invention, what I claim as new, and desire to secure by Letters Patent, is—

1. In a thill-support, the combination with an axle, of a thill connected thereto, a member secured to one of them, means carried by said member adapted to limit the fall of the thill, and supplemental means carried by said member adapted to limit the rise of the thill, said last-named means adapted to lock the thill in its raised position.

2. In a thill-support, the combination with an axle, of a thill connected thereto, a member pivoted to one of them, means carried by said pivoted member adapted to limit the fall of the thill, and supplemental means carried by said pivoted member adapted to limit the rise of said thill, said last-named means adapted to lock the thill in its raised position.

3. In a thill-support, the combination with an axle, of a thill secured thereto, a slotted member secured to one of them and coöperating with the other of them, means carried by said slotted member engaging said slot and adapted to limit the rise of said thill, and supplemental means carried by said slotted member adapted to limit the fall of said thill.

4. In a thill-support, the combination with an axle, of a thill secured thereto, a slotted member pivoted to one of them and coöperating with the other of them, means carried by said member and engaging said slot and adjustably limiting the rise of said thill, and supplemental means carried by said member and engaging said slot and adapted to adjustably limit the fall of said thill.

5. In a thill-support, the combination with an axle, a thill attached thereto, of a slotted member pivoted to said thill, a clip secured to said axle, and supplemental means carried by said pivoted slotted member and adapted to engage said clip for limiting the movement of the thill.

6. In a thill-support, the combination with an axle, a thill attached thereto, and a slotted member pivoted to said thill, of a clip removably secured to said axle and having a slot therein, said pivoted member adapted to engage said slot, means adjustably engaging the slot on said pivoted member to limit the downward movement of said slot, and a spring-pressed member carried by said pivoted member adapted to hold the thill in a predetermined position.

7. In a thill-support, the combination with an axle, a thill attached thereto, of an angle-iron secured to said thill, a slotted member pivoted to said angle-iron, a catch adjustably secured to said pivoted member, an adjusting device adjustably secured to said member, and means intermediate said adjusting device and said catch adapted to coöperate with each to limit the rise and fall of said thill.

8. In a thill-support, the combination with an axle, a thill secured thereto, and a member pivoted to said thill, of a bifurcated clip removably secured to said axle and having a slot therein adapted to receive said pivoted member, a limiting device adjustably secured to said pivoted member adapted to limit the upward movement of said thill, and a catch pivoted to said limiting device and adapted to hold the thill in a predetermined position.

9. In a thill-support, the combination with an axle, a thill secured thereto and a slotted member pivoted to said thill, of a bifurcated clip removably secured to said axle and projecting above, said clip provided with a slot, an inverted-U-shaped member adapted to straddle the pivoted member, set-screws engaging said U-shaped member and the slot of the pivoted member and adapted to hold said U-shaped member in any predetermined position upon the pivoted member, and a spring-pressed catch pivoted within said U-shaped member and adapted to engage said bifurcated clip.

10. In a thill-support, the combination with an axle, and a thill secured thereto, of a slotted member secured to one of them, a slotted member pivoted to the other of them and adapted to coöperate with the secured slotted member, and means adjustably secured to the pivoted slotted member and adapted to engage the secured slotted member to limit the rise and fall of the thill.

11. In a thill-support, the combination with an axle, and a thill attached thereto, of a slotted member secured to one of them, and supplemental means adjustably carried on said slotted member adapted to limit the rise and fall of said thill.

12. In a thill-support, the combination with an axle, and a thill attached thereto, of a slotted member pivoted to one of them, a clip secured to the other of them, and supplemental means adjustably carried on said pivoted slotted member and adapted to engage said clip to limit the rise and fall of said thill.

13. In a thill-support, the combination with an axle, and a thill secured thereto, of a slotted member pivoted to one of them, a slotted clip secured to the other of them, said slotted member adapted to engage the slot in the clip, and means carried by the slotted member adapted to engage said clip to limit the movement of said thill.

14. In a thill-support, the combination with an axle and a thill secured thereto, of a pivoted member having a slot secured to one of them, a clip having a slot removably secured to the other of them, said pivoted member adapted to engage the slot in the clip, means adjustably engaging the slot on the pivoted member to limit the downward movement of the thill, and means carried by said pivoted member adapted to lock the thill in its upper position.

In testimony whereof I hereunto affix my signature in presence of two witnesses.

WM. A. MOELLER.

Witnesses:
   E. E. MOELLER,
   W. A. SIMONTON.